(12) United States Patent
Melanson et al.

(10) Patent No.: US 7,281,996 B2
(45) Date of Patent: *Oct. 16, 2007

(54) GOLF BALL

(76) Inventors: David M. Melanson, 154 State St., Northampton, MA (US) 01060; Michael J. Tzivanis, 36 Tolpa Ct., Chicopee, MA (US) 23454

( * ) Notice: Subject to any disclaimer, the term of this patent is extended or adjusted under 35 U.S.C. 154(b) by 0 days.

This patent is subject to a terminal disclaimer.

(21) Appl. No.: 11/164,448

(22) Filed: Nov. 22, 2005

(65) Prior Publication Data

US 2006/0211515 A1    Sep. 21, 2006

Related U.S. Application Data

(63) Continuation-in-part of application No. 11/152,446, filed on Jun. 13, 2005, which is a continuation-in-part of application No. 10/305,531, filed on Nov. 27, 2002, which is a continuation of application No. 09/877,600, filed on Jun. 8, 2001, now Pat. No. 6,905,424, which is a continuation of application No. 09/411,690, filed on Oct. 1, 1999, now Pat. No. 6,290,614, which is a continuation-in-part of application No. 09/040,798, filed on Mar. 18, 1998, now Pat. No. 6,855,073.

(60) Provisional application No. 60/422,247, filed on Oct. 30, 2002, provisional application No. 60/356,400, filed on Feb. 11, 2002, provisional application No. 60/337,123, filed on Dec. 4, 2001.

(51) Int. Cl.
*A63B 37/12* (2006.01)

(52) U.S. Cl. ...................................... 473/383

(58) Field of Classification Search ................ 473/351, 473/374, 368, 373, 383
See application file for complete search history.

(56) References Cited

U.S. PATENT DOCUMENTS

| | | | |
|---|---|---|---|
| 4,695,055 A |  | 9/1987 | Newcomb et al. |
| 5,779,562 A | * | 7/1998 | Melvin et al. ............ 473/373 |
| 6,083,119 A |  | 7/2000 | Sullivan et al. |
| 6,287,217 B1 |  | 9/2001 | Sullivan et al. |
| 6,290,614 B1 |  | 9/2001 | Kennedy, III et al. |
| 6,309,313 B1 | * | 10/2001 | Peter ........................ 473/378 |
| 6,435,983 B2 |  | 8/2002 | Kennedy, III et al. |
| 6,468,381 B1 |  | 10/2002 | Morgan |
| 6,494,795 B2 |  | 12/2002 | Sullivan |
| 6,503,156 B1 |  | 1/2003 | Sullivan |
| 6,506,130 B2 |  | 1/2003 | Sullivan |
| 6,520,871 B1 |  | 2/2003 | Sullivan et al. |
| 6,530,849 B2 |  | 3/2003 | Peter |
| 6,533,566 B2 |  | 3/2003 | Tzivanis et al. |
| 6,533,682 B2 |  | 3/2003 | Sullivan |
| 6,548,618 B2 |  | 4/2003 | Sullivan et al. |
| 6,595,873 B2 |  | 7/2003 | Sullivan |
| 6,595,874 B2 |  | 7/2003 | Sullivan et al. |
| 6,610,812 B1 |  | 8/2003 | Wu et al. |

(Continued)

*Primary Examiner*—Raeann Trimiew
(74) *Attorney, Agent, or Firm*—Michael A. Catania; Elaine H. Lo

(57) ABSTRACT

A two-piece golf ball having a reaction injection molded polyurethane cover is disclosed herein. The golf ball has a core with a diameter preferably ranging from 1.610 inches to 1.670 inches, and a cover having a thickness preferably ranging from 0.015 inch to 0.045 inch. The cover also preferably has a plurality of deep apertures extending through the cover.

3 Claims, 3 Drawing Sheets

U.S. PATENT DOCUMENTS

| | | |
|---|---|---|
| 6,632,147 B2 | 10/2003 | Cavallaro et al. |
| 6,634,962 B2 | 10/2003 | Sullivan |
| 6,635,716 B2 | 10/2003 | Voorheis et al. |
| 6,638,184 B2 | 10/2003 | Nesbitt et al. |
| 6,638,185 B2 | 10/2003 | Kennedy, III et al. |
| 6,645,088 B2 | 11/2003 | Wu et al. |
| 6,648,777 B2 | 11/2003 | Kennedy, III et al. |
| 6,663,508 B1 | 12/2003 | Keller et al. |
| 6,685,579 B2 | 2/2004 | Sullivan |
| 6,685,580 B2 | 2/2004 | Sullivan |
| 6,688,991 B2 | 2/2004 | Sullivan et al. |
| 6,695,718 B2 | 2/2004 | Nesbitt |
| 6,699,957 B2 | 3/2004 | Gajewski et al. |
| 6,716,954 B2 | 4/2004 | Keller et al. |
| 6,743,123 B2 | 6/2004 | Sullivan |
| 6,755,634 B2 | 6/2004 | Tzivanis et al. |
| 6,762,247 B2 | 7/2004 | Voorheis et al. |
| 6,767,294 B2 | 7/2004 | Nesbitt |
| 6,767,940 B2 | 7/2004 | Voorheis et al. |
| 6,773,363 B2 | 8/2004 | Sullivan |
| 6,773,364 B2 | 8/2004 | Sullivan et al. |
| 6,774,187 B2 | 8/2004 | Voorheis et al. |
| 6,776,731 B2 | 8/2004 | Shannon et al. |
| 6,780,126 B2 | 8/2004 | Voorheis et al. |
| 6,786,838 B2 | 9/2004 | Sullivan et al. |
| 6,787,091 B2 | 9/2004 | Dalton et al. |
| 6,790,149 B2 | 9/2004 | Kennedy, III et al. |
| 6,809,152 B2 | 10/2004 | Harris et al. |
| 6,815,472 B2 | 11/2004 | Lacy |
| 6,817,853 B2 | 11/2004 | Simonds et al. |
| 6,824,476 B2 | 11/2004 | Sullivan et al. |
| 6,896,629 B2 * | 5/2005 | Shannon et al. ............ 473/384 |
| 7,067,081 B2 | 6/2006 | Simonutti et al. |
| 2003/0130068 A1 * | 7/2003 | Tzivanis et al. ............ 473/384 |
| 2005/0245652 A1 * | 11/2005 | Bulpett et al. .............. 524/289 |

* cited by examiner

GOLF BALL

CROSS REFERENCES TO RELATED APPLICATIONS

The Present application is a continuation-in-part application of U.S. patent application Ser. No. 11/152,446, filed Jun. 13, 2005, which is a continuation application of U.S. patent application Ser. No. 09/877,600, filed Jun. 8, 2001, now U.S. Pat. No. 6,905,424, which is a continuation application of U.S. patent application Ser. No. 09/411,690, filed Oct. 1, 1999, now U.S. Pat. No. 6,290,614, which is a continuation-in-part application of U.S. patent application Ser. No. 09/040,798, filed Mar. 18, 1998, now U.S. Pat. No. 6,855,073. The present application is also a continuation-in-part application of U.S. patent application Ser. No. 10/305,531, filed on Nov. 27, 2002, which claims priority to U.S. Provisional Patent Application No. 60/337,123, filed Dec. 4, 2001; U.S. Provisional Patent Application No. 60/356,400, filed Feb. 11, 2002; and U.S. Provisional Patent Application No. 60/422,247, filed Oct. 30, 2002.

BACKGROUND OF THE INVENTION

1. Field of the Invention

The present invention relates to a golf ball. More specifically, the present invention relates to a two-piece golf ball with an oversized core and a reaction injection molded polyurethane cover.

2. Description of the Related Art

Conventionally golf balls are made by molding a cover around a core. The core may be wound or solid. The cover is typically injection molded, compression molded, or cast over the core. Injection molding typically requires a mold having at least one pair of mold cavities, e.g., a first mold cavity and a second mold cavity, which mate to form a spherical recess. In addition, a mold may include more than one mold cavity pair.

In one exemplary injection molding process each mold cavity may also include retractable positioning pins to hold the core in the spherical center of the mold cavity pair. Once the core is positioned in the first mold cavity, the respective second mold cavity is mated to the first to close the mold. A cover material is then injected into the closed mold. The positioning pins are retracted while the cover material is flowable to allow the material to fill in any holes caused by the pins. When the material is at least partially cured, the covered core is removed from the mold.

As with injection molding, compression molds typically include multiple pairs of mold cavities, each pair comprising first and second mold cavities that mate to form a spherical recess. In one exemplary compression molding process, a cover material is pre-formed into half-shells, which are placed into a respective pair of compression mold cavities. The core is placed between the cover material half-shells and the mold is closed. The core and cover combination is then exposed to heat and pressure, which cause the cover half-shells to combine and form a full cover.

As with the above-referenced processes, a casting process also utilizes pairs of mold cavities. In a casting process, a cover material is introduced into a first mold cavity of each pair. Then, a core is held in position (e.g. by an overhanging vacuum or suction apparatus) to contact the cover material in what will be the spherical center of the mold cavity pair. Once the cover material is at least partially cured (e.g., a point where the core will not substantially move), the core is released, the cover material is introduced into a second mold cavity of each pair, and the mold is closed. The closed mold is then subjected to heat and pressure to cure the cover material thereby forming a cover on the core. With injection molding, compression molding, and casting, the molding cavities typically include a negative dimple pattern to impart a dimple pattern on the cover during the molding process.

Materials previously used as golf ball covers include balata (natural or synthetic), gutta-percha, ionomeric resins (e.g., DuPont's SURLYN®), and polyurethanes. Balata is the benchmark cover material with respect to sound (i.e. the sound made when the ball is hit by a golf club) and feel (i.e. the sensation imparted to the golfer when hitting the ball). Natural balata is derived from the Bully Gum tree, while synthetic balata is derived from a petroleum compound. Balata is expensive compared to other cover materials, and golf balls covered with balata tend to have poor durability (i.e. poor cut and shear resistance). Gutta percha is derived from the Malaysian sapodilla tree. A golf ball covered with gutta percha is considered to have a harsh sound and feel as compared to balata covered golf balls.

Ionomeric resins, as compared to balata, are typically less expensive and tend to have good durability. However, golf balls having ionomeric resin covers typically have inferior sound and feel, especially as compared to balata covers.

A golf ball with a polyurethane cover generally has greater durability than a golf ball with a balata cover. The polyurethane covered golf ball generally has a better sound and feel than a golf ball with an ionomeric resin cover. Polyurethanes may be thermoset or thermoplastic. Several patents describe the use of polyurethanes in golf balls.

Gallagher, U.S. Pat. No. 3,034,791 discloses a polyurethane golf ball cover prepared from the reaction product of poly(tetramethylene ether) glycol and toluene-2,4-diisocyanates (TDI), either pure TDI or an isomeric mixture.

Isaac, U.S. Pat. No. 3,989,568 ("the '568 patent) discloses a polyurethane golf ball cover prepared from prepolymers and curing agents that have different rates of reaction so a partial cure can be made. The '568 patent explains that "the minimum number of reactants is three." Specifically, in '568 patent, two or more polyurethane prepolymers are reacted with at least one curing agent, or at least one polyurethane prepolymer is reacted with two or more curing agents as long as the curing agents have different rates of reaction.

Similar to Isaac, PCT International Publication Number WO 99/43394 to Dunlop Maxfli Sports Corporation, discloses using two curing agents to control the reaction time for polyurethane formation. The two curing agents are a dimethylthio 2,4-toluenediamine and diethyl 2,4-toluenediamine, which are blended to control the reaction rate of a toluene diisocyanate based polyurethane prepolymer or a 4,4'-diphenylmethane diisocyanate based polyurethane prepolymer.

Dusbiber, U.S. Pat. No. 4,123,061 ("the '061 patent") discloses a polyurethane golf ball cover prepared from the reaction product of a polyether, a diisocyanate and a curing agent. The '061 patent discloses that the polyether may be polyalkylene ether glycol or polytetramethylene ether glycol. The '061 patent also discloses that the diisocyanate may be TDI, 4,4'-diphenylmethane diisocyanate ("MDI"), and 3,3'-dimethyl-4,4'-biphenylene diisocyanate ("TODI").

Hewitt, et al., U.S. Pat. No. 4,248,432 ("the '432 patent") discloses a thermoplastic polyesterurethane golf ball cover formed from a reaction product of a polyester glycol (molecular weight of 800-1500) (aliphatic diol and an aliphatic dicarboxylic acid) with a para-phenylene diisocyanate ("PPDI") or cyclohexane diisocyanate in the substantial absence of curing or crosslinking agents.

Holloway, U.S. Pat. No. 4,349,657 ("the '657 patent") discloses a method for preparing polyester urethanes with PPDI by reacting a polyester (e.g. prepared from aliphatic glycols having 2-8 carbons reacted with aliphatic dicarboxylic acids having 4-10 carbons) with a molar excess of PPDI to obtain an isocyanate-terminated polyester urethane (in liquid form and stable at reaction temperatures), and then reacting the polyester urethane with additional polyester.

Wu, U.S. Pat. No. 5,334,673 ("the '673 patent") discloses a polyurethane prepolymer cured with a slow-reacting curing agent selected from slow-reacting polyamine curing agents and difunctional glycols (i.e., 3,5-dimethylthio-2,4-toluenediamine, 3,5-dimethylthio-2,6-toluenediamine, N,N'-dialkyldiamino diphenyl methane, trimethyleneglycol-di-p-aminobenzoate, polytetramethyleneoxide-di-p-aminobenzoate, 1,4-butanediol, 2,3-butanediol, 2,3-dimethyl-2,3-butanediol, ethylene glycol, and mixtures of the same). The polyurethane prepolymer in the '673 patent is disclosed as made from a polyol (e.g., polyether, polyester, or polylactone) and a diisocyanate such as MDI or TODI. The polyether polyols disclosed in the '673 patent are polytetramethylene ether glycol, poly(oxypropylene)glycol, and polybutadiene glycol. The polyester polyols disclosed in the '673 patent are polyethylene adipate glycol, polyethylene propylene adipate glycol, and polybutylene adipate glycol. The polylactone polyols disclosed in the '673 patent are diethylene glycol initiated caprolactone, 1,4-butanediol initiated caprolactone, trimethylol propane initiated caprolactone, and neopentyl glycol initiated caprolactone.

Wu, et al., U.S. Pat. No. 5,692,974 discloses golf balls having covers and cores that incorporate urethane ionomers (i.e. using an alkylating agent to introduce ionic interactions in the polyurethane and thereby produce cationic type ionomers).

Hebert, et al., U.S. Pat. No. 5,885,172 ("the '172 patent") discloses a multilayer golf ball giving a "progressive performance" (i.e. different performance characteristics when struck with different clubs at different head speeds and loft angles) and having an outer cover layer formed of a thermoset material with a thickness of less than 0.05 inches and an inner cover layer formed of a high flexural modulus material. The '172 patent provides that the outer cover is made from polyurethane ionomers as described in Wu, et al., U.S. Pat. No. 5,692,974, or thermoset polyurethanes such as TDI or methylenebis-(4-cyclohexyl isocyanate) ("HMDI"), or a polyol cured with a polyamine (e.g. methylenedianiline (MDA)), or with a trifunctional glycol (e.g., N,N,N',N'-tetrakis(2-hydroxpropyl)ethylenediamine).

Wu, U.S. Pat. No. 5,484,870 ("the '870 patent") discloses golf balls having covers composed of a polyurea composition. The polyurea composition disclosed in the '870 patent is a reaction product of an organic isocyanate having at least two functional groups and an organic amine having at least two functional groups. One of the organic isocyanates disclosed by the '870 patent is PPDI.

What is missing from the prior art is a two-piece golf ball with an oversize core and a durable cover.

BRIEF SUMMARY OF THE INVENTION

The present invention provides an oversize core with a durable cover through the use of reaction injection molding a polyurethane cover over an oversize core.

One aspect of the present invention is a two-piece golf ball comprising a core and a cover. The core has a diameter ranging from 1.610 inches to 1.670 inches. The cover has a thickness ranging from 0.015 inch to 0.045 inch. The cover is composed of a reaction injection molded polyurethane material. The golf ball has a diameter ranging from 1.680 inches to 1.685 inches.

Another aspect of the present invention is a two-piece golf ball having a diameter ranging from 1.680 inches to 1.72 inches. The golf ball has a core with a volume ranging from 90 to 95% of the volume of the golf ball and a cover having a volume ranging 5% to 10% of the golf ball. The cover is composed of a reaction injection molded polyurethane material.

Another aspect of the present invention is a two-piece golf ball having a core with a volume ranging from 38 cubic centimeters to 40 cubic centimeters, and a cover with a volume ranging from 2 cubic centimeters to 3 cubic centimeters. The cover is composed of a reaction injection molded polyurethane material. The golf ball has a diameter ranging from 1.680 inches to 1.72 inches.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
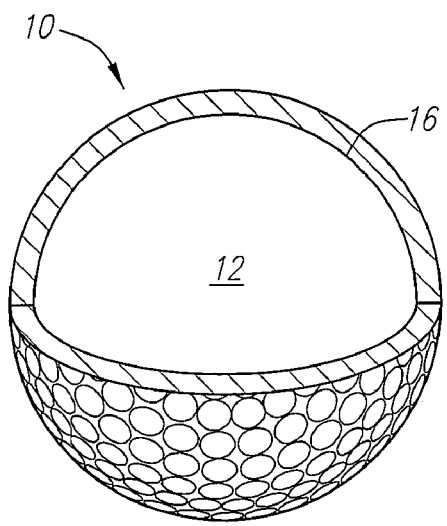
FIG. 1 illustrates a perspective view of a golf ball of the present invention including a cut-away portion core and a cover.
Figure 2:
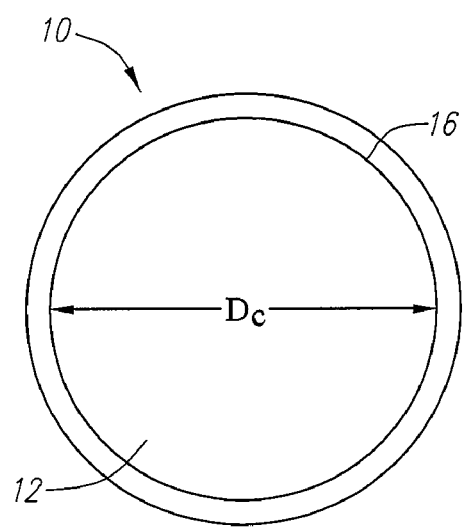
FIG. 2 is a cross-sectional view of a golf ball of the present invention.
Figure 2A:
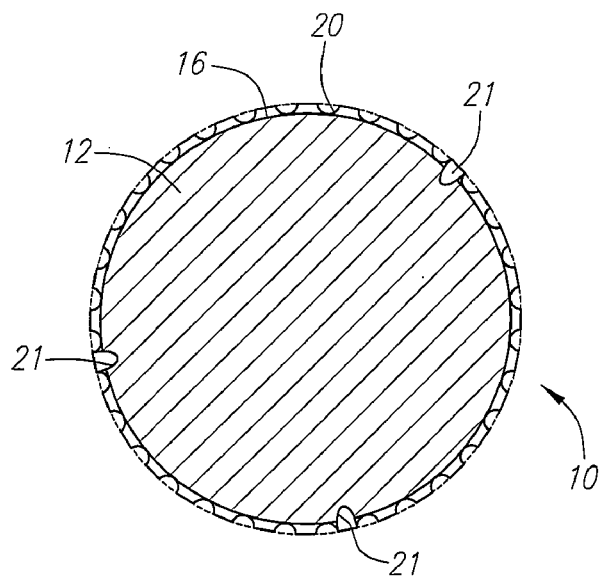
FIG. 2A is a cross-sectional view of an alternative embodiment of a golf ball of the present invention.

As illustrated in FIGS. 1, 2 and 2A, a golf ball is generally indicated as 10. The two-piece golf ball 10 preferably includes a core 12 and a cover 16. The cover 16 is composed of a reaction injection molded polyurethane material. In a preferred embodiment, the cover 16 is formed over the core 12. The core 12 is of a larger size than convention cores thereby allowing for greater distance. The core 12 is capable of obtaining a larger size due to the thinness of the cover 16, which is formed by reaction injection molding.

As shown in FIG. 2A, the cover preferably has a plurality of deep apertures 21 extending through the cover 16. The cover 16 also preferably has a plurality of dimples 20. Those skilled in the art will recognize that the core may be solid, hollow, multi-piece or liquid-filled without departing from the scope and spirit of the present invention.

The cover 16 is formed by reaction injection molding ("RIM") as described below. The core 12 is formed using conventional methods well known in the pertinent art.

In a preferred embodiment, the core 12 is solid. The solid core 12 for the golf ball 10 is preferably about 1.2-1.6 inches in diameter, although it may be possible to use cores in the range of about 1.0-2.0 inches. Conventional solid cores are typically compression or injection molded from a slug or ribbon of uncured or lightly cured elastomer composition comprising a high cis content polybutadiene and metal salt of an α, β, ethylenically unsaturated carboxylic acid such as zinc mono or diacrylate or methacrylate. Preferably, the core comprises at least tow poybutadiene materials, each having a different Mooney viscosity, a zinc oxide material, a zinc stearate material, a zinc diacrylate material and a peroxide material. The core 12 of the present invention is preferably a single solid core such as disclosed in U.S. Pat. No. 6,612,940, assigned to Callaway Golf Company and which pertinent parts are hereby incorporated by reference, or such as disclosed in U.S. Pat. No. 6,465,546, also assigned to Callaway Golf Company and which pertinent parts are hereby incorporated by reference. However, alternative embodiments have a non-solid or multiple cores such as disclosed in U.S. Pat. No. 6,663,509, which pertinent parts are hereby incorporated by reference.

The core 12 preferably has a diameter in the range of 1.610 inches to 1.670 inches. The cover 16 is preferably about 0.015 inch to about 0.045 inch in thickness. Together, the core 12 and the cover 16 combine to form a golf ball 10 preferably having a diameter of 1.680 inches or more, the minimum diameter permitted by the rules of the United States Golf Association and weighing no more than 1.62 ounces.

The cover 16 comprises at least one material selected from the group consisting of polyurethane, polyurea, polyurethane ionomer, epoxy, and unsaturated polyesters, and preferably comprises polyurethane. The material of the cover 16 preferably has a flex modulus in the range of 5,000 to 310,000 pounds per square inch ("psi"), a Shore D hardness in the range of 20 to 90, good durability, and good scuff resistance and cut resistance. As used herein, "polyurethane and/or polyurea" is expressed as "polyurethane/polyurea".

Figure 3:
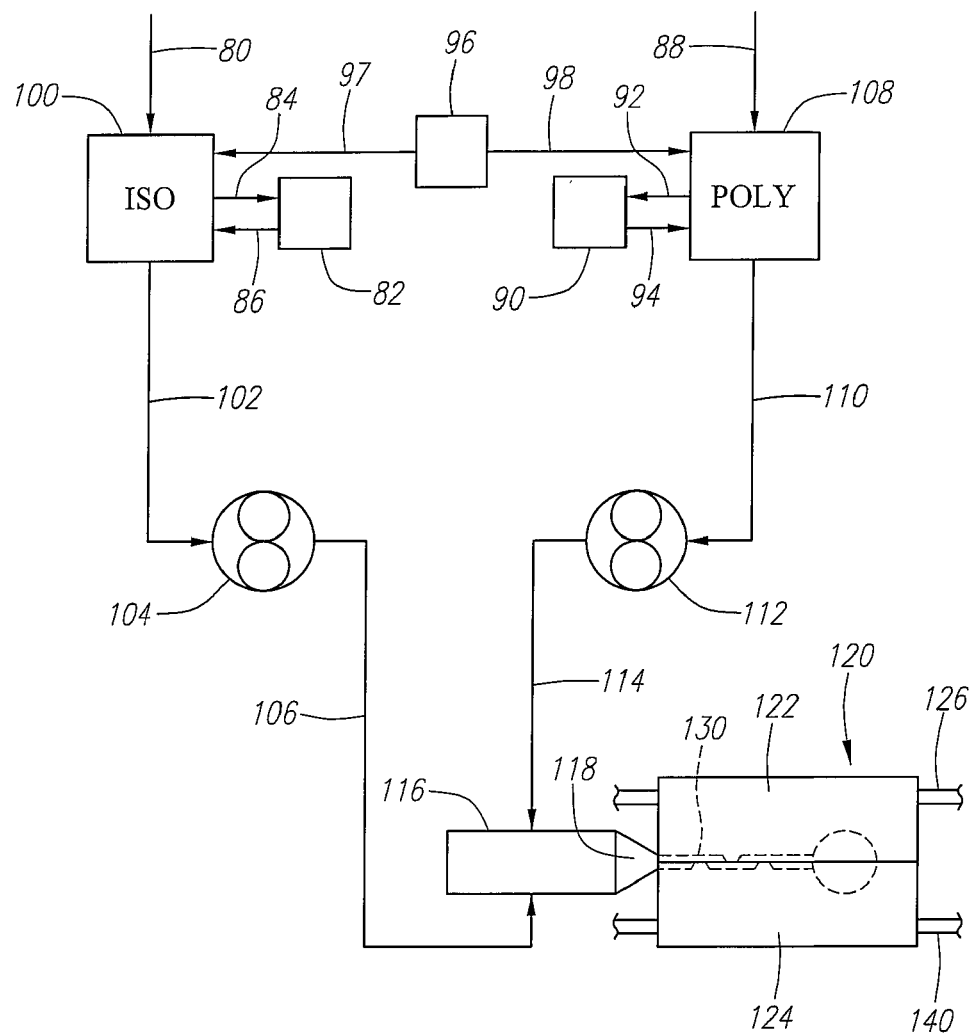
FIG. 3 is a process flow diagram which schematically depicts a reaction injection molding process according to the invention.

Referring to FIG. 3, a preferred embodiment of a process flow diagram for forming a RIM cover 16. An isocyanate component from bulk storage is fed through line 80 to an isocyanate tank 100. The isocyante component is preferably comprises a 4,4'-diphenylmethane diisocyanate ("MDI"). Alternatively, the isocyanate component comprises an isocyanate selected from the group consisting of 3,3'-dimethyl-4,4'-biphenylene diisocyanate ("TODI"), para-phenylene diisocyanate ("PPDI"), and toluene-2,4-diisocyanates (TDI). The polyol component preferably comprises a polyamine, polyester and similar materials. Polyurethane materials suitable for the present invention may be formed by the reaction of a polyisocyanate, a polyol, and optionally one or more chain extenders. The polyol component includes any suitable polyether- or polyester polyol. Additionally, in an alternative embodiment, the polyol component is polybutadiene diol. The chain extenders include, but are not limited to, diols, triols and amine extenders. Any suitable polyisocyanate may be used to form a polyurethane according to the present invention. The polyisocyanate is preferably selected from the group of diisocyanates including, but not limited to, 4,4'-diphenylmethane diisocyanate ("MDI"); 2,4-toluene diisocyanate ("TDI"); m-xylylene diisocyanate ("XDI"); methylene bis-(4-cyclohexyl isocyanate) ("HMDI"); hexamethylene diisocyanate ("HDI"); naphthalene-1,5,-diisocyanate ("NDI"); 3,3'-dimethyl-4,4'-biphenyl diisocyanate ("TODI"); 1,4-diisocyanate benzene ("PPDI"); phenylene-1,4-diisocyanate; and 2,2,4- or 2,4,4-trimethyl hexamethylene diisocyanate ("TMDI").

Other less preferred diisocyanates include, but are not limited to, isophorone diisocyanate ("IPDI"); 1,4-cyclohexyl diisocyanate ("CHDI"); diphenylether-4,4'-diisocyanate; p,p'-diphenyl diisocyanate; lysine diisocyanate ("LDI"); 1,3-bis(isocyanato methyl)cyclohexane; and polymethylene polyphenyl isocyanate ("PMDI").

One additional polyurethane component which can be used in the present invention incorporates TMXDI ("META") aliphatic isocyanate (Cytec Industries, West Paterson, N.J.). Polyurethanes based on meta-tetramethylxylylene diisocyanate (TMXDI) can provide improved gloss retention UV light stability, thermal stability, and hydrolytic stability. Additionally, TMXDI ("META") aliphatic isocyanate has demonstrated favorable toxicological properties. Furthermore, because it has a low viscosity, it is usable with a wider range of diols (to polyurethane) and diamines (to polyureas). If TMXDI is used, it typically, but not necessarily, is added as a direct replacement for some or all of the other aliphatic isocyanates in accordance with the suggestions of the supplier. Because of slow reactivity of TMXDI, it may be useful or necessary to use catalysts to have practical demolding times. Hardness, tensile strength and elongation can be adjusted by adding further materials in accordance with the supplier's instructions.

The polyurethane which is selected for use as a golf ball cover preferably has a Shore D hardness (plaque) of from about 10 to about 55 (Shore C of about 15 to about 75), more preferably from about 25 to about 55 (Shore C of about 40 to about 75), and most preferably from about 30 to about 55 (Shore C of about 45 to about 75) for a soft cover layer and from about 20 to about 90, preferably about 30 to about 80, and more preferably about 40 to about 70 for a hard cover layer.

The polyurethane which is to be used for a cover layer preferably has a flex modulus from about 1 to about 310 Kpsi, more preferably from about 3 to about 100 Kpsi, and most preferably from about 3 to about 40 Kpsi for a soft cover layer and 40 to 90 Kpsi for a hard cover layer. Accordingly, covers comprising these materials exhibit similar properties. The polyurethane preferably has good light fastness.

The isocyanate component is heated to the desired temperature, e.g. 90 to about 150 degrees Fahrenheit ("° F."), by circulating it through heat exchanger 82 via lines 84 and 86. Polyol component is conveyed from bulk storage to a polyol tank 108 via line 88. The polyol blend is heated to the desired temperature, e.g. 90 to about 150° F. by circulating it through heat exchanger 90 via lines 92 and 94. Dry nitrogen gas is fed from nitrogen tank 96 to isocyanate tank 100 via line 97 and to polyol tank 108 via line 98. The isocyanate component is fed from isocyanate tank 100 via line 102 through a metering cylinder or metering pump 104 into recirculation mix head inlet line 106. The polyol component is fed from polyol tank 108 via line 110 through a metering cylinder or metering pump 112 into a recirculation mix head inlet line 114. The recirculation mix head 116 receives the isocyanate component and the polyol component, mixes them, and provides for them to be fed through nozzle 118 into injection mold 120. The injection mold 120 has a top mold 122 and a bottom mold 124. Mold heating or cooling can be performed through lines 126 in the top mold 122 and lines 140 in the bottom mold 124. The materials are kept under controlled temperature conditions to insure that the desired reaction profile is maintained.

The polyol component may also contain additives, such as stabilizers, flow modifiers, catalysts, combustion modifiers, blowing agents, fillers, pigments, optical brighteners, and release agents to modify physical characteristics of the cover.

Inside the mix head 116, injector nozzles impinge the isocyanate and polyol blend at ultra-high velocity to provide excellent mixing. Additional mixing preferably is conducted using an aftermixer 130, which typically is constructed inside the mold between the mix head and the mold cavity.

Figure 4:
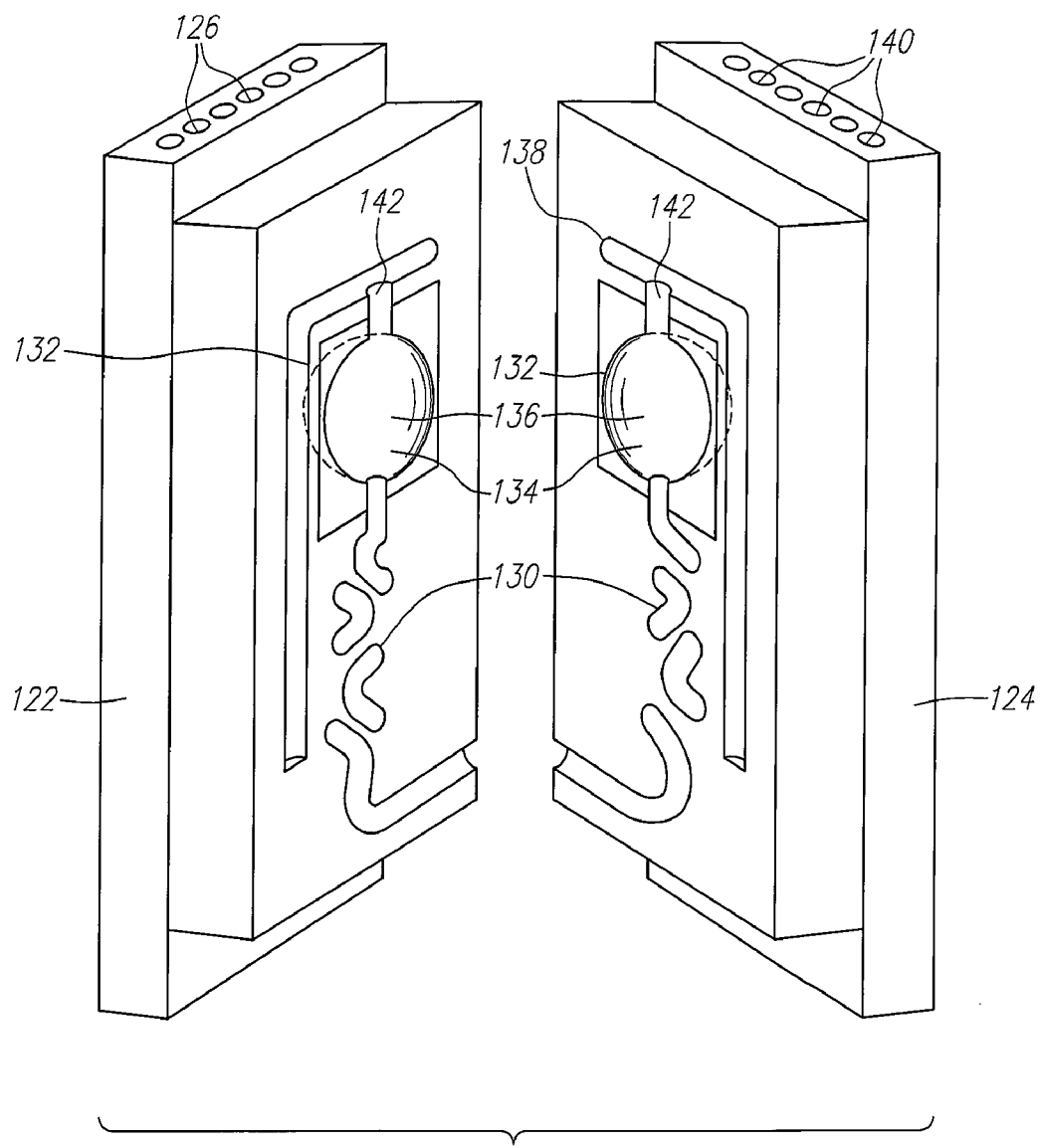
FIG. 4 schematically shows a mold for reaction injection molding a golf ball cover according to the invention.

As is shown in FIG. 4, the mold includes a golf ball cavity chamber 132 in which a spherical golf ball cavity 134 with an aerodynamic spherical surface 136 is defined. The aftermixer 130 can be a peanut aftermixer, as is shown in FIG. 3, or in some cases another suitable type aftermixer, such as a heart, harp or dipper. However, the aftermixer does not have to be incorporated into the mold design. An overflow channel 138 receives overflow material from the golf ball cavity 134 through a shallow vent 142. Heating/cooling passages 126 and 140, which preferably are in a parallel flow arrangement, carry heat transfer fluids such as water, oil, etc. through the top mold 122 and the bottom mold 124.

The mold cavity preferably contains retractable pins and is generally constructed in the same manner as a mold cavity used to injection mold a thermoplastic, e.g., ionomeric golf ball cover. However, two differences when RIM is used are that tighter pin tolerances generally are required, and a lower injection pressure is used. Also, the molds can be produced from lower strength material such as aluminum.

Non-limiting examples of suitable RIM systems for use in the present invention are Bayflex® elastomeric polyurethane RIM systems, Baydur® GS solid polyurethane RIM systems, Prism® solid polyurethane RIM systems, all from Bayer Corp. (Pittsburgh, Pa.), SPECTRIM reaction moldable polyurethane and polyurea systems from Dow Chemical USA (Midland, Mich.), including SPECTRIM MM 373-A (isocyanate) and 373-B (polyol), and Elastolit SR systems from BASF (Parsippany, N.J.). Preferred RIM systems include Bayflex® MP-10000 and Bayflex® 110-50, filled and unfilled. Further preferred examples are polyols, polyamines and isocyanates formed by processes for recycling polyurethanes and polyureas. Peroxides, such as MEK-peroxide and dicumyl peroxide can be used. Furthermore, catalysts or activators such as cobalt octoate 6% can be used in the RIM process.

RIM processes and materials that are useful in forming the golf ball of the present invention are disclosed in the following U.S. patents, all of which are hereby incorporated by reference in their entireties: U.S. Pat. No. 6,290,614 for a Golf Ball Which Includes Fast-Chemical-Reaction-Produced Component And Method Of Making Same; U.S. Pat. No. 6,533,566 for an Apparatus For Making A Golf Ball, U.S. Pat. No. 6,716,954 for a Golf Ball Formed From A Polyisocyanate Copolymer And Method Of Making Same; U.S. Pat. No. 6,755,634 for an Apparatus For Forming A Golf Ball With Deep Dimples; U.S. Pat. No. 6,776,731 for an Apparatus And Process For Forming A Golf Ball With Deep Dimples; and, U.S. Pat. No. 6,790,149 for a Golf Ball.

The golf ball 10 formed according to the present invention can be coated using a conventional two-component spray coating or can be coated during the RIM process, i.e., using an in-mold coating process. After molding, the golf ball 10 produced may undergo various further processing steps such as buffing, painting and marking as disclosed in U.S. Pat. No. 4,911,451, which pertinent parts are hereby incorporated by reference.

During the RIM process, the chemical reaction, i.e., the mixture of isocyanate component from the isocyanate tank and polyol component from the polyol tank, occurs during the molding process. Specifically, the mixing of the reactants occurs in the recirculation mix head and the after mixer, both of which are connected directly to the injection mold. The reactants are simultaneously mixed and injected into the mold, forming the desired component.

Typically, prior art techniques utilize mixing of reactants to occur before the molding process. Mixing under either compression or injection molding occurs in a mixer that is not connected to the molding apparatus. Thus, the reactants must first be mixed in a mixer separate from the molding apparatus, then added into the apparatus. Such a process causes the mixed reactants to first solidify, then later melt in order to properly mold.

The RIM process also allows for lower temperatures and pressures during molding than does injection or compression molding. Under the RIM process, the molding temperature is maintained at about 100-120° F. in order to ensure proper injection viscosity. In comparison, compression molding is typically completed at a higher molding temperature of about 320° F. an injection molding is completed at even a higher temperature range of 392-482° F. Molding at a lower temperature is beneficial when, for example, the cover is molded over a very soft core so that the very soft core does not melt or decompose during the molding process.

The RIM process also creates more favorable durability properties in a golf ball than does conventional injection or compression molding. The preferred process of the present invention provides improved durability for a golf ball cover by providing a uniform or "seamless" cover in which the properties of the cover material in the region along the parting line are generally the same as the properties of the cover material at other locations on the cover, including at the poles. The improvement in durability is due to the fact that the reaction mixture is distributed uniformly into a closed mold. This uniform distribution of the injected materials eliminates knit-lines and other molding deficiencies which can be caused by temperature difference and/or reaction difference in the injected materials. The RIM process of the present invention results in generally uniform molecular structure, density and stress distribution as compared to conventional injection molding processes, where failure along the parting line or seam of the mold can occur because the interfacial region is intrinsically different from the remainder of the cover layer and, thus, can be weaker or more stressed.

The RIM process also is relatively faster than the conventional injection and compression molding techniques. In the RIM process, the chemical reaction takes place in under 5 minutes, typically in less than two minutes, preferably in under one minute and, in many cases, in about 30 seconds or less. The demolding time of the present application is 10 minutes or less. The molding process alone for the conventional methods typically take about 15 minutes. Thus, the overall speed of the RIM process makes it advantageous over the injection and compression molding methods.

The core 12 typically have a coefficient of restitution of about 0.750 or more, more preferably 0.770 or more and a PGA compression of about 90 or less, and more preferably 70 or less, and most preferably from 40 to 60. The core used in the golf ball of the invention preferably is solid. The term "solid cores" as used herein refers not only to one piece cores but also to those cores having a separate solid layer beneath the covers and over the central core. The cores have a weight of 35-41 grams. When the golf ball of the invention has a solid core, this core can be compression molded from a slug of uncured or lightly cured elastomer composition comprising a high cis content polybutadiene and a metal salt of an $\alpha, \beta$, ethylenically unsaturated carboxylic acid such as zinc mono- or diacrylate or methacrylate. To achieve higher coefficients of restitution and/or to increase hardness in the core, the manufacturer may include a small amount of a metal oxide such as zinc oxide. In addition, larger amounts of metal oxide than are needed to achieve the desired coefficient may be included in order to increase the core weight so that the finished ball more closely approaches the U.S.G.A. upper weight limit of 1.620 ounces. Non-limiting examples of other materials which may be used in the core composition including compatible rubbers or ionomers, and low molecular weight fatty acids such as stearic acid. Free radical initiator catalysts such as peroxides are admixed with the core composition so that on the application of heat and pressure, a curing or cross-linking reaction takes place.

The thickness of the cover 16 preferably ranges from 0.015 inch to 0.045 inch, more preferably ranges from 0.020 inch to 0.030 inch.

The Shore D hardness of the golf ball 10, as measured on the golf ball, is preferably between 40 Shore D points to 75 Shore D points, and most preferably between 50 Shore D points and 65 Shore D points. The hardness of the golf ball 10 is measured using an Instron Shore D Hardness measurement device wherein the golf ball 10 is placed within a holder and the pin is lowered to the surface to measure the hardness. The average of five measurements is used in calculating the ball hardness. The ball hardness is preferably measured on a land area of the cover 14. The preferred overall diameter of the golf ball 10 is approximately 1.68 inches, and the preferred mass is approximately 45.5 grams. However, those skilled in the pertinent art will recognize that the diameter of the golf ball 10 may be larger (e.g. 1.70 inches or 1.72 inches) without departing from the scope and spirit of the present invention. Further, the mass may also vary without departing from the scope and spirit of the present invention. The golf ball preferably has a PGA compression ranging from 50 to 70, and a coefficient of restitution ranging from 0.78 to 0.81.

The surface geometry of the golf ball 10 is preferably a conventional dimple pattern such as disclosed in U.S. Pat. No. 6,213,898 for a Golf Ball With An Aerodynamic Surface On A Polyurethane Cover, which pertinent parts are hereby incorporated by reference. Alternatively, the surface geometry of the golf ball 10 may have a non-dimple pattern such as disclosed in U.S. Pat. No. 6,290,615 for A Golf Ball Having Tubular lattice Pattern, which pertinent parts are hereby incorporated by reference.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

What is claimed is:

1. A two-piece golf ball consisting essentially of:
    a core having a diameter ranging from 1.640 inches to 1.660 inches;
    a cover having a thickness ranging from 0.020 inch to 0.030 inch, wherein the cover is composed of a reaction injection molded polyurethane material and has a plurality of deep apertures extending through the cover to the core;
    wherein the golf ball has a diameter ranging from 1.680 inches to 1.685 inches.

2. A two-piece golf ball consisting essentially of:
    a core having a volume ranging from 38 cubic centimeters to 40 cubic centimeters and a diameter ranging from 1.640 inches to 1.660 inches; and
    a cover disposed over the core, the cover having a volume ranging from 2 cubic centimeters to 3 cubic centimeters and a thickness ranging from 0.020 inch to 0.030 inch, wherein the cover is composed of a reaction injection molded polyurethane material and has a plurality of deep apertures extending through the cover to the core;
    wherein the golf ball has a diameter ranging from 1.680 inches to 1.72 inches.

3. A two-piece golf ball consisting essentially of:
    a core having a volume ranging from 90 to 95% of the volume of the golf ball and a diameter ranging from 1.640 inches to 1.660 inches; and
    a cover having a volume ranging 5% to 10% of the golf ball and a thickness ranging from 0.020 inch to 0.030 inch, wherein the cover is composed of a reaction injection molded polyurethane material and has a plurality of deep apertures extending through the cover to the core;
    wherein the golf ball has a diameter ranging from 1.680 inches to 1.72 inches.

* * * * *